United States Patent Office 2,872,333
Patented Feb. 3, 1959

2,872,333

PYROTECHNIC METHOD FOR INCREASING THE BASICITY OF LEAD SULFATE CONTAINING PIGMENTS

Clovis H. Adams, Chicago, Ill.

No Drawing. Application June 3, 1957
Serial No. 662,970

17 Claims. (Cl. 106—256)

This invention relates to a method of manufacture of an improved class of lead sulfate containing pigments characterized by their high level of available lead or basicity and their specific crystal habit.

This application is a continuation-in-part of my copending application U. S. Serial No. 303,151, filed August 7, 1952, now abandoned.

More particularly, this invention relates to a method for the conversion of lead sulfate containing pigments selected from the group consisting of normal and basic sulfates of white lead and leaded zinc oxides initially of low order of reactivity due to lead basicity to pigmentary lead sulfate containing products preferably of from not less than 30% to not more than about 74% available lead or basicity calculated on the total lead pigment present in the final pigmentary product. Products of a pigmentary nature produced in accordance with this invention are further characterized by their totally and consistently nodular crystal habit and their substantial lack of effect upon the viscosity or body of outside house paints when they are incorporated in them as a part of the pigmentary component thereof. Prior art processes utilizing aqueous techniques have been found to produce products characterized by an acicular crystal habit and the tendency to cause viscosity increase in house paint formulations.

Formulators of outside house paints have learned the advantages which accrue through the use of combinations of lead pigments and zinc pigments together with titanium dioxide and inert pigments in outside house paints. Extensive exposure tests have demonstrated the desirability of a proper balance between lead, zinc and titanium pigments in such products. Recent researches have pointed the way to the advantage in increased durability when lead sulfate containing pigments of increased basicity are a part of outside house paint compositions.

Unfortunately, lead sulfate containing pigments of high order of basicity, heretofore commercially available, have been so reactive when used as to cause marked effect upon the viscosity of the liquid paint during storage periods before their application in films. One of the commercial basic sulfate pigments presently on the market, having an increased basicity, has the structure $3PbO \cdot PbSO_4 \cdot H_2O$. Of the 83.6% lead content, 75% of the lead is available to form lead soaps when it is used as a pigmentary component of house paints. Tests have shown this product to be overly reactive with the siccative oil components of the usual house paint of the class generally in service today. Above about 2 pounds per 100 gallons the paint will ultimately gel. Litharge, which has 100% of its lead content available to form soaps, is also overly reactive and paint products of the class of interest here when formulated with appreciable quantities, e. g., above 10 pounds per 100 gallons, will gel upon extended storage. Furthermore, the color of litharge limits its usage, for above small amounts yellowing and discoloration of white house paints becomes evident.

By the method herein disclosed, it is possible to increase the basicity or available lead content of lead sulfate containing pigments to relatively high levels without impairing the package stability of the outside house paints containing such pigment. From what has gone before and what follows below, the advantages of products made in accordance with my process having high available lead contents, yet of such controlled reactivity that they may be used in house paint formulations without danger of gelation upon extended storage, will be seen.

As shown above, a particular hydrated basic lead sulfate product having 83.6% total lead content of which 75% is available to form soaps in paint compositions is too reactive for the uses indicated. However, by the process hereinafter disclosed, it is possible to increase the basicity of lead sulfates containing pigments even as far as the tetrabasic form, e. g., $4PbO \cdot PbSO_4$, containing 86.7%, of which 80% is available, to obtain a product not excessively reactive in liquid paint systems in bulk storage. By the method, the nature of the crystal habit of the pigment can be changed to, or originally produced in, a nodular form, and in that form it can be safely used in house paints without undue effect upon the package stability of such products.

To illustrate the above statement, a series of outside house paints were made over a standard formulation (similar to the house paints of the examples included herein) which are balanced for equal zinc oxide, available lead, titanium dioxide and equivalent pigment volume concentration utilizing basic lead sulfates made in accordance with this invention compared with the usual basic lead sulfate of commerce and litharge as comparatives. In the following table, the viscosities of the identified paints were measured with a Krebs-Stormer viscometer (Krebs units) and with a Cleveland cup using a #3 orifice. The latter instrument is of the efflux type, and as indicated in the tabulated data is limited to compositions which will flow under very low shearing stress. Note the remarkable stability of paints 352, 353, 354 and 355 over the test period.

TABLE I

| Paint No. | Type of Lead Pigment | Consistency—Days of Test ||||||
|---|---|---|---|---|---|---|---|
| | | 1 | 4 | 11 | 30 | 60 | 244 |
| 349 | Commercial Basic Lead Sulfate: | | | | | | |
| | Krebs | 83 | 83 | 82 | 82 | 82 | 78 |
| | Cleveland | 29.6 | 31.4 | 27.7 | 29.1 | 28.4 | 23.6 |
| 352 | Monobasic Lead Sulfate [1]: | | | | | | |
| | Krebs | 84 | 84 | 84 | 83 | 83 | 80 |
| | Cleveland | 34.5 | 35.2 | 33.4 | 34.5 | 32.7 | 27.1 |
| 353 | Dibasic Lead Sulfate [1]: | | | | | | |
| | Krebs | 82 | 82 | 82 | 78 | 78 | 78 |
| | Cleveland | 31.2 | 32.6 | 27.0 | 24.6 | 23.2 | 23.8 |
| 354 | Tribasic Lead Sulfate [1]: | | | | | | |
| | Krebs | 83 | 82 | 80 | 79 | 80 | 82 |
| | Cleveland | 30.0 | 29.3 | 24.6 | 24.0 | 25.5 | 26.5 |
| 355 | Tetrabasic Lead Sulfate [1]: | | | | | | |
| | Krebs | 82 | 81 | 80 | 79 | 80 | 82 |
| | Cleveland | 30.9 | 28.8 | 23.0 | 22.5 | 25.9 | 27.9 |
| 356 | Litharge: | | | | | | |
| | Krebs | 140 | 123 | 80 | 81 | 82 | 88 |
| | Cleveland | Too Thick | Too Thick | 22.4 | 27.2 | 33.4 | 40.5 |

[1] Pigment prepared by the method of the invention.

For the purposes of this invention, normal lead sulfates and leaded zinc oxides have been found to be adaptable to the process disclosed. It is to be noted that each of these pigmentary products contains lead sulfate. It is the lead sulfate portion of the pigment that can be acted upon as herein shown to change and increase the level of available lead present in them.

Modification of the group of pigments above to a more basic character leads to improved balance in the pigmentation of paint films. The available lead content of the pigment in a paint film is assumed to react with the fatty acid components present in the oil or developed upon aging and exposure of the film to produce lead soaps which tend to plasticize the film. Zinc soaps, formed by similar reactions, are believed to contribute materially to the hardness or brittleness of the film on age. Through proper balance of available lead and zinc pigments in the film, toughness and plasticity are developed to yield a film more resistant to premature failure of the film by checking and cracking. Pigments of increased basicity as to lead have indicated the way to outside house paints of improved durability, less cost to manufacture and consequent economic advantages to the consumers of them. Additional economic advantages accrue through the use of lead sulfate containing pigments of increased basicity. By their use, more economic advantage is made of a metallic element which becomes critical in times of national stress. Less lead pigment is needed if more of that which is used serves in the capacity of its highest value. However, the lead pigments of increased basicity heretofore suggested are far too reactive for general use in outside house paints and their excessive reactivity has been a roadblock in the development of low total lead but high available lead paint formulations.

From the above, the term "available lead" or "basicity" with respect to lead as used herein is meant the lead present in the pigmentary product, reactive with organic acidic constitutents to form soaps in films of house paints when exposed to the elements upon exposure. Manufacturers of lead pigments often refer to "available lead" and "basicity" as a sulfur deficiency in the basic lead sulfate.

Normal lead sulfates contain little or no lead basicity. Basic sulfates of white lead available commercially generally contain from about 10% to about 20% of available lead. Leaded zinc oxides are of wide composition. The percentage of combined lead in leaded zinc oxides varies from several percent of $PbO.PbSO_4 + nPbSO_4$ to over 50% of total lead. As leaded zinc oxides are of two types, e. g., co-fumed and blended, the percentage of the total lead present that is available can be varied within rather wide limits.

In the usual methods of manufacture of co-fumed leaded zinc oxides or the lead components of blended leaded zinc oxides, the percentage of basicity is limited to low levels due to the corrosive effect of basic lead on the refractory lining of the furnace which serves in their manufacture and to the poor color characteristics of the products formed when high basicity is desired in the product.

From the above it can be seen that lead sulfate containing pigments of increased basicity are desirable for the formulation of outside house paints. Further, it has been shown that pigments of this general class have been priorly made by aqueous techniques, but that such processes lead to pigmentary products of a hydrated form and an acicular crystal habit. Repeated tests of lead compounds of acicular crystal habit have shown that they are too reactive for commercial acceptance in outside house paint formulations. In that field, advantages have been recognized but the limitations of acicular and hydrated basic lead compounds not fully appreciated.

It is, therefore, the general object of this invention to provide a simple, practical and economic method for increasing the basicity of lead sulfate containing pigments, but at the same time to produce pigments of this class in a crystal habit of such character that the rate of reaction between the pigment, when incorporated into an outside house paint, is of such nature as to allow a practical storage life without danger of premature gelation of the paint while in the bulk state in the package, or such reactivity as to increase the viscosity of the liquid paint product beyond the point where it retains satisfactory application characteristics.

More specifically, it is the object of this invention to provide a method for the conversion of lead pigments of a low order of basicity to lead pigments of a high order of basicity and to produce at the same time a non-hydrated pigmentary product of controlled particle size range and of nodular crystal habit.

It is still another object of this invention to produce a lead sulfate pigment of the class selected from the group consisting of basic lead sulfate and leaded zinc oxides of increased basicity, of nodular crystal habit and of numerical average particle diameter of from 0.3 to 0.6 micron, which although reactive in films of outside house paint upon exposure to the elements, is not sufficiently reactive with such paints while in the liquid bulk state during prolonged storage to interfere with paint package life, nor with application characteristics of the paint product.

A more limited objective is to provide a method for the conversion of lead sulfate containing pigments of increased basicity, made by methods which result in pigmentary particles of acicular crystal habit, over to pigmentary particles of the same numerical average particle size but of a nodular crystal habit and less reactive character.

Extensive use of the term "basicity" as it applies to the pigmentary products referred to herein may require further discussion. In order to reduce the complexity of expression, "basicity," as previously indicated, refers to the lead ion present in combination with lead sulfate which is available to form soaps with organic acids of a paint either in film or fluid form.

In referring to basic lead sulfates, four principal compositions serve as benchmarks for the purposes of exposition. These include the monobase, $PbO.PbSO_4$ which is calculated to be 42.4% basic lead; the dibase, which has 59.46% available lead or basicity and is considered to be $2PbO.PbSO_4$; the tribase, containing 68.8% basicity and illustrated as $3PbO.PbSO_4$; and the tetrabasic form, $4PbO.PbSO_4$, containing 74.6% available lead or basicity. It is both feasible and practical to produce products of intermediate levels of basicity as will become apparent in the following explanatory development.

The basicity of leaded zinc oxides as discussed herein is also related to the same fundamental concepts for the purposes of expression. For example, one may speak of a leaded zinc oxide, 35% leaded, having a basicity of 42.4% (PbO . . . based upon the total lead pigment) of which 50% is available lead metal (Pb). Application of these figures to a pigment having the general structure $xPbO.PbSO_4yZnO + zPbSO_4$ will show that the $zPbO.PbSO_4 + zPbSO_4$ accounts for 35% of the pigment weight and that $yZnO$ accounts for the remaining 65% of the pigment, which is zinc oxide. The 42.4% basicity refers entirely to the 35% leaded portion of the pigment. In other words, approximately 13% of the total pigment ($xPbO.PbSO_4yZnO + zPbSO_4$) is available to form lead soaps when the illustrative pigment is dispersed in a house paint formulation; whereas, from 4% to 8% lead is available in commercial leaded zinc oxides, 35% leaded, available today. Thus theoretically, leaded zinc oxides may be considered as monobasic, dibasic, tribasic and tetrabasic in the same manner as the basic sulfates of white lead. From the illustrative structural formula above, it can be seen that some of the lead component may be merely a physical admixture of neutral $PbSO_4$ with an additional quantity of lead oxide (PbO) in combination with $PbSO_4$ as shown by the illustrative structural formula $PbO.PbSO_4$, indicating something more than a physical mixture of the lead oxide and lead sulfate.

In its broadest aspect, this invention provides the following process:

A lead containing pigment selected from the group consisting of normal and basic sulfate white lead and leaded zinc oxides is intimately mixed with a source of lead oxide. While we prefer to accomplish the intermixing dry by passing the blend through a suitable type of pulverizer, e. g., a centrifugal roller mill (Raymond mill) or hammer mill, the admixture may be produced by wet or dry ball milling or by wet or dry blending.

The leaded zinc oxide selected may be either blended or co-fumed. The lead oxide source may be any lead compound not volatile under the conditions of the reaction capable of forming lead oxide at a temperature of from 500 degrees C. to about 725 degrees C. in an oxidizing atmosphere. Compounds found to form lead oxide under the above conditions include, but are not essentially limited to: lead suboxide, litharge, lead dioxide, lead hydroxide, red lead and basic carbonate of white lead. Organic compounds of lead are of theoretical interest only. It is known that lead acetate and lead oxalate will decompose to form lead oxide. Other organic lead compounds are known to be volatile (e. g., tetraethyl lead) at the roasting temperature stated and are of no value for the purposes of this invention. Practically, litharge is preferred in the practice of the process herein disclosed. Obviously, however, other sources of lead oxide are available and are equivalent from a purely functional view.

After thorough admixture of the lead sulfate containing pigment with the previously determined amount of a source of lead oxide, the amount dependent upon the level of basicity desired in the ultimate product within the limits of the basicity possible to achieve and still produce a white product, the mix is calcined at a temperature of from 500 degrees to 725 degrees C. The temperature of calcining or muffling is quite critical to the production of a product useful for pigmentary purposes. Below 500 degrees C., the reaction is incomplete. If blending is entirely anhydrous, 550 degrees is a more satisfactory lower limit of temperature. In certain instances, where the level of basicity of the resultant product is low, white products may be obtained at minimum low temperature below those stated, but such products are photosensitive and tend to darken upon exposure to light, evidencing incomplete reaction. If the reaction is complete, the products of increased basicity are not photosensitive. Above about 725 degrees C., the particles of the reactants tend to sinter. Sintering destroys the texture of the product, making the product difficult, if not impossible, to disperse properly in paint milling equipment, in spite of the usual post-calcination milling in the dry state. Excessively high temperature additionally destroys the pigmentary properties of the product to reduce hiding power or capacity and tinting strength or whitening power. Excessive time of roasting is also detrimental to the quality of the product. Overheating, either by too long a time of roasting at top temperature or too high a temperature, has been observed to encourage sintering. Extensive tests have shown the reaction to be essentially completed in from 15 to 30 minutes at top heat. Pigments of optimum quality have been obtained at a temperature of from 625 degrees C. to about 700 degrees C. and a time of from 15 minutes to not over an hour of calcination.

A factor found to be critical in the production of lead sulfate containing pigments of increased basicity of a quality suitable for paint pigments is the numerical average particle diameter of the lead sulfate pigment reactant used in the process. It is surprising to find that the ultimate pigment particle size is practically the same as the reactant particle despite the condensation reaction. In other words, there is apparently no growth observable between the original particles and the final product particles although it is evident that condensation occurs.

It has been found that the average particle diameter of the lead sulfate pigment reactant lies preferably in the range of from 0.4 to 0.5 micron and that satisfactory products can be obtained if the average particle diameter is within the range of from 0.3 to 0.6 micron.

The average particle diameter of the lead source is not particularly critical. When the lead source is litharge, as it will be in most commercial operations, it has been determined by trial that litharge as coarse as 40 mesh can be used if the lead sulfate containing pigment and the litharge are subjected to a pre-milling to obtain intimate admixture of the reactants. However, one has to go out of the way to obtain 40 mesh litharge and this trial was made only to determine if there were, in fact, limitations upon the particle diameter of the lead source.

It is preferable that the litharge used be of such particle diameter that it will pass through a 325 mesh sieve, which is characteristic of most sources of litharge. No particular difficulty is experienced with litharge passing through a 200 mesh sieve (about 70 microns average particle diameter) if care is taken to assure intimate admixture of the reactant particles. As commercial litharge sources furnish the material standardly having an average particle diameter of from one to three microns, the above discussion concerns a question more theoretical than real, and it is believed correct to state that the average particle diameter of the lead oxide source is not a critical dimension.

By the term "numerical average particle diameter," it is here meant to refer to Martins diameters as determined by means of an optical microscope using visible light wherein the instrument has a theoretical resolving power of about 0.2 micron. (See Handbook of Chemical Microscopy, Chamot and Mason, volume 1, second edition, pages 415 to 417.)

Products of the herein described process are invariably of nodular crystal habit and the process is applicable to produce pigmentary products of increased basicity to the extent of about 74% available lead. As previously indicated, prior art wet methods have been utilized to increase the basicity of lead sulfate, but the products obtained are, as far as it has been possible to ascertain, of acicular crystal habit. The term "acicular" as used here and customarily in the art refers to a crystal of needle shape wherein the long dimension is at least three times the narrow dimension. The term "nodular" is used in contradistincition to acicular. Nodular particles are generally of approximately equal dimensions. Sometimes it is necessary to resort to the electron microscope to differentiate between the crystal habit of two products.

In the art of formulation of outside house paints, it is well known that the crystal habit of the various pigmentary components has a material effect upon the performance of the paint and the durability of the films deposited from the paint. Considering that acicular zinc oxide is generally conceded to be superior to the nodular form in outside house paint formulations, it is quite unexpected to find that the nodular form of basic sulfate white lead and particularly nodular forms of leaded zinc oxide of increased basicity are more durable than acicular forms. Upon review of the art, it is noteworthy that so much research has been done in this field without mention of the advantages of the nodular form of lead sulfate containing pigments of increased basicity in outside house paint formulations.

Stewart, U. S. Patent 2,249,330, discloses that certain lead pigments in acicular crystal habit have advantages. Pfansteil, U. S. Patent 2,194,526, refers to the advantages of basic sulfate white lead in house paints. However, it is reported by the latter patentee that his pigments have a marked effect upon the viscosity of the paint system, and from this fact, as well as a study of his copending application, U. S. Serial #147,481 (later abandoned) it is apparent that his work related to the acicular form of basic lead sulfate. That Pfansteil's pigments were of acicular structure is deduced from the aqueous methods used which, upon repetition in the laboratory, were found to produce acicular products.

One of the surprising advantages of the nodular form of lead sulfate containing pigments made by calcination technique to increase their basicity is their remarkable stability after formulation into outside house paint systems. A series of experiments were conducted whereby the mono, di-, tri- and tetrabasic sulfates of white lead were made by an aqueous method involving the ball-milling of litharge with normal lead sulfate as well as by the roasting method herein disclosed. Additionally, aliquot portions of samples of the pigments made by the aqueous methods were washed, filtered off, dried and calcined according to the time and temperature of my process. Further experimental or trial runs were made increasing the basicity of lead sulfate pigments in accordance with the pyrotechnic method here set forth from a basicity of 1.4% through a series of levels to a maximum of about 74% basicity. The dry pigments obtained were then made up into house paints over a standard test formulation. Viscosity measurements were made at periodic intervals over a period of from 244 to 439 days and the data recorded (see Table I). A study of this data shows only differences in viscosity inherent in the method of its determination. In other words, viscosity remained practically constant over time of the test with those samples containing pigment made in accordance with this invention. This was also observed to be the case with samples prepared from pigments initially prepared by wet milling followed by dry roasting at a temperature within the range of 500 degrees C. to about 725 degrees C. However, samples of paints containing pigments of increased basicity made in aqueous slurry were found to exhibit tendencies towards gelation as evidenced by unstable viscosities during the period of study. Further, microscopic examinaton checked with prior observations for the latter pigments were found to be of an acicular crystal habit. It is interesting to note that even the tetrabasic form of basic lead sulfate, e. g., $4PbO.PbSO_4$ made by pyrotechnic method did not vary in body appreciably with age. It is to be recalled that a pigment of very similar formula, e. g $3PbO.PbSO_4.H_2O$ is too reactive for use in house paints in the requisite quantities.

In the practice of this invention, difficulty was experienced with certain commercial sources of leaded zinc oxide containing minor amounts of color-forming impurities. Some of the available varieties were found to be limited in the level of basicity to which they could be taken without objectionable color development. In certain instances, upon attempting to make pigmentary materials up to and above the monobase, e. g., $PbO.PbSO_4$ with these leaded zinc oxide sources, sufficient color developed to prohibit the use of the products in white paints. It was found by a modification in the process steps, this limitation could be disposed of in part and that up to and including the tetra base can be made, for example, by certain relatively simple changes in the process outlined above.

In the modified process, grades of leaded zinc which had given trouble were water-wetted and thoroughly mixed with the requisite quantity of lead oxide to increase the basicity of the commercial leaded zinc. After thorough wet-blending, the lower grades of leaded zinc oxide plus lead oxide could be calcined at slightly lower temperatures, e. g., about 500 degrees C. to not above 650 degrees C. and preferably not above 625 degrees C. for some color devaluation occurs in the last 25 degrees C. interval of increase.

Intimate blending can also be accomplished by wet milling in a ball mill, pebble mill, rod mill or similar type of wet milling equipment to produce an aqueous slurry having pigmentary particles of from 0.3 to 0.6 micron numerical average particle diameter. Particularly good results have been obtained by use of a pug mill which requires a minimum of water to yield aqueous pastes with the water present considerably reduced over ball milling. By the described added aqueous blending or milling step, there appears to be a color stabilizing effect upon the ultimate product. A chemical stabilizing reaction is apparently stimulated in the inherent impurities by the presence of water in the blend. Theoretical reasons for the fixative properties of the added wet-milling step upon color are not understood, although the practical value has been demonstrated. Perhaps a large measure of the advantage in color is that the temperature of final calcination to form the leaded pigment of increased basicity may be reduced to a range of from 500 degrees to 650 degrees C., broadly and preferably from 550 degrees to 625 degrees C. Within this latter range, superior color values have been obtained.

The above additional step of wet-milling of the reactants essential to increasing the basicity of off-grades of leaded zinc oxide prior to calcination broadens the usefulness of the invention and has certain commercial importance. However, the additional step is not essential when the reactant materials are of sufficient purity to avoid discoloration as is the case with many commercial sources of lead sulfate, basic lead sulfate and leaded zinc oxides.

The following examples are included as illustrative of my process, but although they are of curtailed number, such limitation is not to be construed as limiting upon the usefulness or scope of the process herein described and claimed.

*Example 1*

Two parts of litharge of numerical average particle diameter of from 1 to 3 microns particle diameter were intimately mixed with 10 parts of normal lead sulfate of about 0.4 micron particle diameter in the dry. The yelow product, after heating to a temperature of 715 degrees C. for one hour had converted over. The product was white, of nodular crystal habit, and after milling with linseed oil and exposure to light showed no darkening characteristic as when unreacted litharge is present in lead sulfate.

The above example was repeated later, holding the temperature of calcination to about 675 degrees C. Superior pigmentary characteristics were obtained upon reducing the temperature to this level.

*Example 2*

0.24 part litharge as used in Example 1 was intimately mixed with 10 parts of a leaded zinc oxide, 12% leaded in the dry state of numerical average particle diameter of about 0.5 micron. The mixed powders are heated dry for one hour at a temperature of 715 degrees C. The resultant product was of superior whiteness to the original leaded zinc oxide pigment, and when dispersed in linseed oil, the paste showed no darkening of color as is apparent when unreacted litharge is present in a leaded zinc oxide pigment so tested. The product exhibited a nodular crystal habit when observed under a light microscope.

This example was also repeated lowering the temperature to about 650 degrees C. Superior pigmentary properties were noted in the example calcined at the lower temperature.

*Example 3*

7.5 parts litharge and 10 parts of normal lead sulfate from the same raw materials as in Examples 1 and 2 were intimately mixed together and dispersed in 50 parts of water. The aqueous slurry was then boiled until the yellow color due to the litharge had disappeared. The recovered basic lead sulfate was determined to have an acicular crystal habit when examined after magnification by electron microscopy techniques.

The acicular product (produced in accordance with U. S. 969,474) was washed with an excess of water and dried. After recovery of the dry pigment product, it was then roasted at a top temperature of about 675 degrees C. for fifteen to thirty minutes. After roasting, the product had improved whiteness of color, and upon microscopic examination, appeared to be totally nodular in crystal habit.

*Example 4*

73.9 parts of litharge having a numerical average particle diameter of from 1 to 4 microns were ball milled in an aqueous slurry for four days with 25.35 parts of normal lead sulfate of from 0.3 to 0.5 micron particle diameter. The product was filtered, washed and dried. Microscopic examination showed acicular particles. The recovered solid particles were subjected to roasting at a top temperature of 675 degrees C. for thirty minutes. The resulting pigmentary product was found to have a predominantly nodular crystal habit and to correspond to the tetrabase, e. g., $4PbO.PbSO_4$. The average particle size had not changed appreciably over that of the lead sulfate reactant employed.

*Example 5*

73.9 parts litharge and 25.35 parts neutral lead sulfate of the same specification as in Example 4 were initially mixed and subjected to roasting at a top temperature of 675 degrees C. for thirty minutes. The product was white, completely nodular and of the same average particle size as the lead sulfate reactant employed.

*Example 6*

20 parts normal lead sulfate were intimately mixed with 12.4 parts basic carbonate of white lead (equivalent to 10.8 parts litharge) by passing the dry blended mixture through a hammer mill using a herringbone screen aperture 0.5 x 0.013" and a speed of 9600 R. P. M.

The dry blend was charged into a furnace at 715 degrees C. for thirty minutes. The resultant white product was found to be totally nodular in crystal habit and to have a basicity of 35%.

*Example 7*

20 parts of leaded zinc oxide of the co-fumed type containing 35% lead sulfate-lead oxide pigment and 65% zinc oxide of 6.2% basicity, based upon the total lead pigment were dry milled by the method of Example 6 with 3.18 parts of red lead (97.1% $Pb_3O_4$ which is equivalent to 3.10 parts litharge) and roasted at 715 degrees C. for thirty minutes. A product of good color, of completely nodular crystal habit, having a basicity of 35% was obtained.

*Example 8*

349 parts normal lead sulfate, 252 parts litharge of the same specification as in Example 4 were dry blended and pulverized as in Example 6. Thereafter the mixture was roasted at a temperature of 625 degrees C. for thirty minutes. The product had an available basicity of 42.9%, was not sensitive to light and of excellent white color.

*Example 9*

100 parts of a co-fumed leaded zinc oxide of commerce containing 12% total lead and 88% zinc oxide were intimately mixed with 9.67% parts litharge by the method of Example 6.

The dry blend was then placed in a muffle furnace at 625 degrees C. for thirty minutes. The resultant product was of better color than the original leaded zinc oxide, was of nodular crystal habit and upon testing for light sensitivity by spatulating a portion of the product with linseed oil was found not to darken, indicating complete reaction.

*Example 10*

1000 parts of a co-fumed leaded zinc oxide of commerce containing 35% total lead and 65% zinc oxide of about 5% basicity were intimately mixed by the method of Example 6 with 184 parts color makers litharge of about 2 microns average particle diameter.

The dry blend was roasted at a temperature of 650 degrees C. for thirty minutes in an electric muffle. The product was whiter than the original leaded zinc, had a nodular crystal habit, and a basicity of 42% although the zinc oxide content had been reduced by only 11%.

*Example 11*

Same as Example 10, except a blended leaded zinc of commerce was substituted for the co-fumed type of the same composition, e. g., 35% lead pigment, 65% zinc oxide, but in this instance the original basicity was 17% of the total lead pigment present in the blend. Upon increase to a 42% basicity by the method of Example 10, had superior color when dry roasted at a temperature of 650 degrees C., although little change was noted in a repeat run at 700 degrees C. Additional examples prepared by increasing the basicity to 60, 67 and 73% by the same method gave products of good color and nodular crystal habit.

The advantages, formula wise, in utilizing lead sulfate containing pigments of increased basicity and nodular crystal habit are shown in the following modifications of standard house paint formulas.

*Example 12*

460 pounds leaded zinc oxide 35% leaded, 6% basicity
160 pounds anatase $TiO_2$
307 pounds magnesium silicate
33 gallons raw linseed oil
15 gallons heat bodied linseed oil $Z_2$-$Z_3$ (Gardner-Holdt)

are mixed and ground together to form a smooth paste. The paste is then thinned with 26⅛ gallons mineral spirits and drier added.

This paint represents a standard house paint, having 299 pounds zinc oxide and 27.6 pounds available lead to form soaps present in the paint system.

*Example 12–A*

The 460 pounds of leaded zinc oxide of Example 12 were replaced with a pigment made in accordance with this invention. The replacement pigment contains 81% zinc oxide and 19% basic lead sulfate of 40% basicity. Only 343 pounds of this pigment yield the same quantity of lead and zinc soaps. Considerable cost reduction without sacrifice in durability is thus obtained. The formula is as follows:

343 pounds leaded zinc oxide, 20% leaded, 8% basicity
190 pounds $TiO_2$ (anatase)
340 pounds magnesium silicate are mixed with the same quantity and quality of vehicle as in Example 12. Here there are 298 pounds zinc oxide and 28 pounds available lead present to form soaps. Yield 100 gallons.

*Example 13*

[High lead content outside house paints]

460 pounds leaded zinc oxide, 35% leaded
100 pounds basic lead sulfate of commerce
150 pounds titanium dioxide
290 pounds magnesium silicate
   are mixed with:
54 gallons raw linseed oil
4 gallons heat bodied linseed oil ($Z_2$-$Z_3$ Gardner Holdt)
15 gallons thinner (mineral spirits) and drier
Yield 100 gallons.

In the above formula there are 298 pounds of zinc oxide, and a total of 262 pounds basic sulfate white lead.

Example 13–A

In this modification, the commercial leaded zinc oxide is replaced with a leaded zinc oxide of increased basicity containing 80% zinc oxide and 20% monobasic lead sulfate (42% basicity). The formula is rebalanced for bulking and hiding power as follows:

372 pounds leaded zinc oxide, 80% ZnO, 20% monobasic lead sulfate
80 pounds commercial basic sulfate white lead
176 pounds titanium dioxide
318 pounds magnesium silicate The above pigmentation was mixed and ground with the same quantity of the same liquid constituents as in Example 13. Comparatively the above formula contains 298 pounds ZnO, 74 pounds basic sulfate white lead from the leaded zinc oxide, or a total of 162 pounds basic sulfate white lead. This formulation saves 100 pounds of lead pigment over Example 13.

Example 14

470 pounds leaded zinc oxide, 35% leaded
150 pounds titanium dioxide
315 pounds magnesium silicate
    are mixed and ground with:
38 gallons raw linseed oil
16 gallons heat bodied linseed oil. Z body (Gardner-Holdt) and thinned with
20½ gallons mineral spirits and drier.
100 gallons yield. The above formula contains 305 pounds zinc oxide and 165 pounds basic sulfate white lead.

Example 14–B

The pigmentation of this example is similar to Example 14, but all of the lead pigment is replaced with tetrabasic lead sulfate made in accordance with this invention at an equal available lead content, again balancing the pigment bulking with magnesium silicate to yield 100 gallons of paint having equivalent hiding to the other examples 298 pounds zinc oxide
56 pounds tetrabasic lead sulfate
202 pounds titanium dioxide are mixed and ground and afterwards thinned with the same quantity and quality in liquids as in Example 13. Here there are 298 pounds zinc oxide and 56 pounds basic sulfate white lead (74% available lead). This represents a reduction in total lead pigment of 206 pounds, yet still has the same amount of useful lead present for soap formation.

It is obvious from the above examples that basic lead sulfates of increased basicities, intermediate between the monobase and tetrabase made in accord with this invention, may be used in place of the low basicity lead sulfates of commerce with distinct savings in total lead pigment. Exposure results on these paints now available show that this savings may be made without sacrifice in performance or durability in the resultant paint products.

Example 14–C

The leaded zinc oxide of Example 14 is replaced with a leaded zinc oxide of increased basicity (1) containing 80% zinc oxide and 20% basic lead sulfate of 40% basicity as follows:

380 pounds leaded zinc (1)
175 pounds TiO$_2$
336 pounds magnesium silicate

The above pigmentation is mixed, ground and thinned in accordance with Example 14. It contains 305 pounds of zinc oxide and 75 pounds of basic sulfate white lead (40% basicity).

This formulation has the same zinc content and slightly more available lead than Example 14, yet saves 80 pounds of lead pigment.

Example 15

(This example is illustrative of a standard formulation of the present day type, set forth for comparative purposes.)

450 pounds leaded zinc oxide, 35% leaded (6% basicity)
50 pounds basic sulfate white lead (16% basicity)
150 pounds TiO$_2$
290 pounds magnesium silicate The above pigment was mixed and ground to a smooth paste with 28 gallons raw linseed oil
20 gallons heat bodied linseed oil Z$_2$–Z$_3$ (Gardner-Holdt) and thinned with
27 gallons mineral spirits and drier.

The formula contains 293 pounds available zinc oxide and 207 pounds basic sulfate white lead.

Example 15–A

All of the lead sulfate of Example 15 is replaced with tribasic lead sulfate of nodular crystal habit made by the process of this invention (2) to make a paint of equal yield, hiding power and pigment volume concentration. It is pigmented as follows:

293 pounds zinc oxide
48 pounds tribasic lead sulfate (2)
190 pounds TiO$_2$
332 pounds magnesium silicate The paint was completed as in Example 15. Note that the total lead pigment has been reduced from 207 pounds to 48 pounds, or a savings of 159 pounds of lead pigment. The paint product has excellent package stability and exposure tests show good performance and durability.

Example 15–B

This example is identical with Example 15–A, except 49 pounds of hydrated tribasic lead sulfate of acicular crystal habit is substituted for the 48 pounds of tribasic lead sulfate (2) of Example 15–A.

In this instance, viscosity instability of the paint upon storage and gelation tendencies were observed. Application characteristics, e. g., brushing and flow were poor. The material brushed hard and left heavy brush marks. Exposure tests revealed early checking and cracking. Exposure at Chicago and Florida confirmed early chalking with only slightly less dirt collection than shown in Example 15.

Partial explanation for the superiority is believed to reside in the difference in proposed structures of the two very similar lead compounds.

The formula for hydrated tribasic lead sulfate is 3PbO.PbSO$_4$.H$_2$O, structurally represented

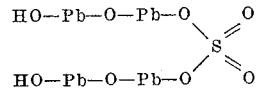

whereas the tribase of this invention is represented as 3PbO.PbSO$_4$, or structurally as

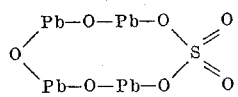

Note the condensed structure in the latter product which is believed to account for much of the behavior difference in paint systems.

The following examples have been selected to demonstrate the practical lack of critical nature of the average particle diameter of the lead oxide source in available commercial ranges of particle size.

A particular lot of a leaded zinc pigment having an average particle diameter of from 0.3 to 0.6 micron containing 86.7% ZnO, 11.7% PbSO$_4$ and 0.36% ZnSO$_4$ was set aside for experimental use. This pigment is hereinafter referred to as the "standard lead sulfate pigment."

A commercial litharge, classed as a color makers grade, showed upon examination a particle diameter of from 3 to 44 microns (all passed through a 325 mesh sieve) with a fundamental particle size of 3 to 10 microns. This material was used in tests labeled with the letter A.

A quantity of the above litharge was subjected to elutriation and a fraction was recovered containing litharge of above 12.5 microns to not above about 44 microns in particle diameter. This is identified by the letter D in the examples.

A sample of unground litharge was obtained from a manufacturer. The fundamental particle size was in the range of from 1 to 5 microns, but containing a large proportion of larger particles that appeared to be made up of sintered or fused smaller particles. 73% appeared to be smaller than 325 mesh. At least 22% was larger than 74 microns in particle diameter. Tests using this litharge are labeled with the letter B.

A portion of the unground litharge was separated into three fractions by dry screening. The fraction identified as C-1 passed through a 40 mesh and was retained on 100 mesh (149 to 420 microns particle size), C-2 passed through a 100 mesh and was retained on a 200 mesh (74 to 149 microns particle size), and C-3 which passed through a 200 mesh but was retained on a 325 mesh sieve (44 to 74 microns particle diameter).

A series of lead sulfate pigments of increased basicity were prepared using standard proportions, namely 100 parts of standard lead sulfate pigment plus 8.3 parts of litharge (as identified). The resulting pigment contained 80.3% ZnO and 18.7% monobasic lead sulfate containing 38.7% basicity or 7.2% PbO and 11.4% PbSO$_4$.

Intimate mixtures of the standard lead sulfate pigment and various particle size litharge samples were prepared for calcination by the following methods.

(1) *Tumbling.*—Weighed portions of the standard lead sulfate pigment were charged to a cylindrical mixing vessel and the litharge distributed over the top of the charge. The closed container was rolled at an angle of 30 degrees from the horizontal and then tumbled end over end with the sequence repeated several times. The container was opened and the large pellets were broken down with a spatula.

(2) *Blending.*—The standard pigment and the litharge were coarsely mixed with a spatula in a mortar. The components were intermixed by means of the pestle, care being used that only the weight of the pestle be exerted upon the content of the mortar to avoid any grinding action.

(3) *Dry grinding.*—Weighed quantities of the standard pigment and litharge were first tumbled as described above, then subjected to one pass through a hammer mill at 14,000 R. P. M. through a 0.013 inch herringbone screen.

(4) *Wet milling.*—A one gallon pebble mill charged with ½" to 1" flint pebbles, 433.2 grams of standard pigment plus litharge and 1040 grams water were wet-milled for 8 hours. The recovered slurry was de-watered and dried to constant weight at 110° C.

All samples were subjected to calcination as follows:

*Calcination.*—Standard charges of 50 grams of mixed components in accordance with one of the above methods were weighed out in fire-clay dishes and heated to 685° C. for 30 minutes.

Samples of each test run were dispersed (10 g. pigment in 2½ ml. of white refined linseed oil) by hand milling and laid upon glass plates to an approximate 10 mil thickness. The brightness, corresponding to the green; and the yellowness, corresponding to the amber minus the blue divided by the green, of the standard tristimulus color system were determined by means of a Hunter Reflectometer on each sample of pigment of increased basicity prepared. A yellowness value of 14.7 was considered slightly high and above this value, not acceptable. Pigment products below this value of yellowness were all considered commercially acceptable.

The summary of test data is recorded in the following table:

TABLE II

| Test Ident. | Mixing Procedure | Brightness G. | Yellowness $\left(\frac{A-B}{G}\right)$ | Remarks |
|---|---|---|---|---|
| A-1 | Tumbling | 79.6 | 16.4 | Too yellow. |
| A-2 | Blending | 80.0 | 14.7 | Slightly high value. |
| A-3 | Dry Grinding | 79.6 | 13.8 | Satisfactory. |
| A-4 | Wet Milling | 79.9 | 13.6 | Do. |
| D1 | Blending | 79.6 | 14.6 | Nearly acceptable. |
| B-2 | do | 79.4 | 15.3 | Too yellow. |
| B-3 | Dry Grinding | 80.4 | 13.8 | Satisfactory. |
| B-4 | Wet Milling | 80.0 | 14.0 | Do. |
| C1-1 | Blending | 76.8 | 19.3 | Too Yellow. |
| C1-2 | Dry Grinding | 80.3 | 14.3 | Acceptable. |
| C1-3 | Wet milling | 79.5 | 14.5 | Do. |
| C2-4 | Blending | 78.8 | 16.6 | Too Yellow. |
| C3-5 | do | 80.0 | 14.8 | Value slightly too high. |

Data recorded in Table II and the results observed indicate a particle size of 70 microns is a probable practical maximum for manufacture of a commercially acceptable lead sulfate containing pigment of increased basicity.

Litharge as coarse as 40 mesh (149 microns) will produce a product of maximum whiteness, if the litharge-lead sulfate pigment is dry ground prior to calcination. As this is coarser than commercial fineness, if the lead oxide source is kept below 325 mesh no difficulty should be experienced. From a purely practical viewpoint, then, the particle diameter of the lead oxide source is not critical.

As a result of experimental work with aqueous processes for the manufacture of basic lead sulfates, it was observed that there were generally present traces of water soluble lead salts believed to effect the nature of the crystal habit of products made by aqueous methods. In the preferred method of practice of this invention, washing out water soluble materials of this nature is recommended to insure against sintering problems during the course of the final calcination step.

Generally speaking, as the level of basicity of the products of interest is increased or the percentage of zinc oxide in the particular leaded zinc oxide selected increased, a gradual shift in temperature towards the upper limits of the temperature range for muffling are indicated. It has been observed that neutral lead sulfate, of itself, when roasted in accordance with the teachings of this invention, sinters. However, upon increasing the basicity by incorporation of a lead oxide source of the class indicated, the effects of sintering upon the final pigmentary products made within the stated process conditions has not been observed. Further addition of small quantities of zinc oxide, or the use of leaded zinc overcomes tendencies, if any there are, to sinter during the course of the reaction under the specified process conditions.

Commercial grades of basic sulfate white lead are made by heating lead ores containing PbS with coal in an oxidizing atmosphere. A fume in the vapor phase at a temperature of about 2000 to 2400 degrees F. condenses with the sulfurous oxides to form the basic sulfates of commerce. The extent of the basicity is controlled by the sulfur deficiency in the furnace charge. While the level of basicity in the basic sulfates of commerce may be as high as 20%, operating at this level puts a severe burden on the refractory lining of the furnace due to the corrosive attack of the basic lead upon the refractory. For this reason, basic lead sulfates having substantial basicity are not available due to said practical problems.

As mentioned earlier, leaded zinc oxides are of two types, blended and co-fumed. Blended leaded zincs, as the name implies, are physical admixtures of zinc oxide with lead sulfates of varying basicity. The basicity in this case may be controlled by the nature of the lead sulfate combined with the zinc oxide. Co-fumed leaded zinc oxides are made by careful co-reduction of lead and zinc ores. The ores, which contain lead sulfide and zinc oxide formed by roasting zinc sulfide, are mixed with chatts (a siliceous residue), iron, silica, calcium, etc., and coal. The charge is fed into a furnace and the lead and zinc metal formed by the reduction are volatilized upwards from the furnace charge into an atmosphere rich in sulfur trioxide and oxygen. As the fume cools, it is believed that a solid solution of zinc oxide in basic sulfate of white lead forms. Both forms of leaded zinc, e. g., blended and co-fumed, may be used as intermediate materials in the process of this invention.

While this invention applies to the manufacture of both basic sulfate white lead and leaded zinc oxides of increased basicity two differences in the behavior of these compounds one as compared to the other have been noted. The first difference has relation to the second. One is that the higher the zinc content or the more basic the lead component, the higher the process temperature may be taken without objectionable sintering. The second is that leaded zinc oxides tend to have superior texture to zinc free basic sulfate white lead when processed under comparable conditions. It is believed that the zinc oxide acts to inhibit sintering effects, harmful to the pigmentary products of the reaction, by a dilution effect upon the principal reactants, namely, lead sulfate and lead oxide.

Having thus described my invention and illustrated its practice by example, I claim:

1. A method for the manufacture of a lead sulfate-lead oxide containing pigment which comprises calcining a lead sulfate containing pigment with a quantity of a second lead compound capable of forming lead oxide in intimate admixture under the conditions of the process herein defined of a quantity sufficient to increase the basicity of the final pigmentary product to more than 30% but not more than about 74%, said lead sulfate containing pigment having a numerical average particle diameter of from 0.3 to 0.6 micron and subjecting said reactants to an oxidizing atmosphere at a temperature of from 550° C. to not more than about 725° C. for a time sufficient to combine all of said lead oxide reactant with said lead sulfate reactant to form a completely nodular crystal habit pigment characterized by its essentially non-bodying effect upon linseed oil paints in storage after having been incorporated in such paint and a particle size range of essentially the same particle diameter as that of the aforesaid lead sulfate reactant, said time at least about 15 minutes but insufficient to sinter the final pigment particles.

2. The method of claim 1 wherein the lead sulfate containing pigment is a leaded zinc oxide pigment.

3. The method of claim 1 wherein the temperature of heating during calcination is not less than 625° C. nor more than about 700° C.

4. The method of claim 1 wherein the final pigmentary product contains available lead as PbO which corresponds to the monobase and is of the order of 42% by weight of the final pigment.

5. The method of claim 1 wherein the final pigmentary product contains available lead as PbO which corresponds to the dibase and is of the order of 59% by weight of the final pigment.

6. The method of claim 1 wherein the final pigmentary product contains available lead as PbO, which corresponds to the tribase, and is of the order of 68% by weight of the final pigment.

7. The method of claim 1, wherein the final pigmentary product contains available lead as PbO, which corresponds to the tetrabase, and is of the order of 74% by weight of the final pigment.

8. The method of claim 1, wherein the lead sulfate containing pigment is a neutral lead sulfate.

9. The method of claim 1, wherein the initial lead sulfate containing pigment is a basic lead sulfate containing less than 20% lead oxide.

10. The method of claim 1, where the second lead compound is lead oxide.

11. The method of claim 1, where the second lead compound is lead suboxide.

12. The method of claim 1, where the second lead compound is basic carbonate of white lead.

13. The method of claim 1, where the second lead compound is red lead.

14. The method of claim 1, where the second lead compound is lead hydroxide.

15. A method for the manufacture of a basic lead sulfate containing pigment which comprises milling a leaded zinc sulfate pigment with a quantity of a second lead compound whose residue at temperatures within the range of 500° C. to not above 650° C. consists essentially of lead oxide, said leaded zinc pigment having an average particle diameter of from 0.3 to 0.6 micron, calcining the resultant mass in an oxidizing atmosphere at a temperature within a 500° to 700° C. temperature range until all of said particles are in a nodular crystal habit of the same average particle diameter as said initial lead sulfate containing reactant which time is at least about fifteen minutes but is insufficient to sinter the product particles, the quantity of said second lead compound sufficient to form a final pigmentary product containing more than 30% but not more than about 74% basicity as combined PbO.

16. The method of claim 15 wherein the calcination temperature is above 500° C. but not above about 650° C.

17. A paint containing a drying oil vehicle and as one essential pigmentary component thereof a white, nodular, basic lead sulfate containing pigment having more than 30% but not more than about 74% basicity as combined, latently reactive, PbO by weight of the total of said lead sulfate containing pigment, said pigment formed by calcining a corresponding lead sulfate pigment having an average particle diameter of from 0.3 to 0.6 micron in an oxidizing atmosphere with an oxide of lead having a particle diameter not exceeding about 150 microns at a temperature of from 550 to 725° C. for at least fifteen minutes but not for a time sufficient to sinter the product particles, said paint characterized by its relatively constant viscosity over extended periods of time and longer useful life when exposed in thin films to outside weather conditions.

References Cited in the file of this patent

UNITED STATES PATENTS

| | | |
|---|---|---|
| 1,933,750 | Negishi | Nov. 7, 1933 |
| 2,026,033 | Gregory et al. | Dec. 31, 1935 |
| 2,134,528 | Mitchell | Oct. 25, 1938 |
| 2,194,526 | Pfanstiel | Mar. 26, 1940 |
| 2,197,605 | Barton | Apr. 16, 1940 |
| 2,477,277 | Williams et al. | July 26, 1949 |

OTHER REFERENCES

Mattiello, J. J.: "Protective and Decorative Coatings," John Wiley & Sons, New York 1944, vol. IV, page 282.

National Paint Dictionary Stewart, 3rd edition, 1948, Stewart Research Laboratory, Washington, D. C., page 346.

UNITED STATES PATENT OFFICE
CERTIFICATE OF CORRECTION

February 3, 1959

Patent No. 2,872,333

Clovis H. Adams

It is hereby certified that error appears in the above numbered patent requiring correction and that the said Letters Patent should read as corrected below.

In the grant, lines 1, 2, and 3, for "Clovis H. Adams, of Chicago, Illinois," read -- Clovis H. Adams, of Chicago, Illinois, assignor to The Sherwin-Williams Company, of Cleveland, Ohio, a corporation of Ohio, --; line 12, for "Clovis H. Adams, his heirs" read -- The Sherwin-Williams Company, its successors --; in the heading to the printed specification, line 5, for "Clovis H. Adams, Chicago, Ill." read -- Clovis H. Adams, Chicago, Ill., assignor to The Sherwin-Williams Company, Cleveland, Ohio, a corporation of Ohio --; column 5, line 55, for "capacity" read -- opacity --; column 11, line 46, for "quality in" read -- quality of --.

Signed and sealed this 26th day of May 1959.

(SEAL)
Attest:

KARL H. AXLINE
Attesting Officer

ROBERT C. WATSON
Commissioner of Patents